US006918473B2

(12) United States Patent
Deferme

(10) Patent No.: US 6,918,473 B2
(45) Date of Patent: Jul. 19, 2005

(54) STROKE DEPENDENT BYPASS

(75) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/666,051

(22) Filed: Sep. 17, 2003

(65) Prior Publication Data

US 2005/0056506 A1 Mar. 17, 2005

(51) Int. Cl.$^7$ ................................................ F16F 9/50
(52) U.S. Cl. ........................ 188/322.15; 188/282.1
(58) Field of Search .......................... 188/280, 282.5, 188/304, 316, 322.13, 322.15

(56) References Cited

U.S. PATENT DOCUMENTS

| | | | |
|---|---|---|---|
| 3,180,453 A | | 4/1965 | Murata |
| 3,232,390 A | * | 2/1966 | Chano .................... 188/280 |
| 3,570,635 A | * | 3/1971 | Takagi .................... 188/280 |
| 3,570,636 A | * | 3/1971 | Franz et al. ............... 192/3.57 |
| 4,832,162 A | | 5/1989 | Bacardit |
| 4,953,671 A | * | 9/1990 | Imaizumi ................. 188/282.3 |
| 5,058,715 A | * | 10/1991 | Silberstein ................ 188/280 |
| 5,242,038 A | | 9/1993 | Yamaoka |
| 5,248,014 A | * | 9/1993 | Ashiba .................... 188/282.8 |
| 5,404,972 A | | 4/1995 | Popjoy et al. |
| 5,911,290 A | | 6/1999 | Steed |
| 5,927,449 A | | 7/1999 | Huang et al. |
| 6,119,831 A | * | 9/2000 | Knecht et al. ............ 188/282.2 |
| 6,220,409 B1 | * | 4/2001 | Deferme ................. 188/322.15 |
| 6,467,593 B1 | * | 10/2002 | Corradini et al. ........... 188/289 |
| 2003/0098210 A1 | * | 5/2003 | Miller et al. ............. 188/282.6 |

* cited by examiner

*Primary Examiner*—Christopher P. Schwartz
(74) *Attorney, Agent, or Firm*—Harness, Dickey & Pierce, PLC

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a compression and a rebound valve assembly. The piston assembly also includes a housing attached to the piston rod which defines a pressure chamber within which is slidably disposed a piston to define upper and lower fluid chambers. The pressure chamber is in communication with the upper working chamber through a passageway extending through the piston rod. The housing, piston and fluid chambers provide two stage damping in rebound and compression with a smooth transition between soft and firm damping.

12 Claims, 4 Drawing Sheets

STROKE DEPENDENT BYPASS

FIELD OF THE INVENTION

The present invention relates to a hydraulic damper or shock absorber adapted for use in a suspension system such as the systems used for automotive vehicles. More particularly, the present invention relates to a hydraulic damper having a two-stage damping characteristic where a relatively low level damping is provided for small amplitudes of movement and a relatively high level of damping is provided for large amplitudes of movement.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension stroke of the hydraulic damper and a second valving system is incorporated for generating damping force during the compression stroke of the hydraulic damper.

Various types of damping force generating devices have been developed to generate desired damping forces in relation to the speed and/or the displacement of the piston within the cylinder. These multi-force damping force generating devices have been developed to provide a relatively small or low damping force during the normal running of the vehicle and a relatively large or high damping force during maneuvers requiring extended suspension movements. The normal running of the vehicle is accompanied by small or fine vibrations of the unsprung mass of the vehicle and thus the need for a soft ride or low damping characteristic of the suspension system to isolate the sprung mass from these small or fine vibrations. During a turning or braking maneuver, as an example, the sprung mass of the vehicle will attempt to undergo a relatively slow and/or large vibration which then requires a firm ride or high damping characteristics of the suspension system to support the sprung mass and provide stable handling characteristics to the vehicle. Thus, these multi-force damping force generating devices offer the advantage of a smooth steady state ride by eliminating the high frequency/small excitations from the sprung mass while still providing the necessary damping or firm ride for the suspension system during vehicle maneuvers causing larger excitations of the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides damping which varies according to the stroke amplitude. Soft damping is provided for small strokes and firm damping is provided for large strokes. The variable damping is provided by a fluid cylinder and piston assembly located on the end of the piston rod in the lower working chamber. The interior of the fluid cylinder is in communication with the hydraulic fluid in the upper working chamber. When the shock absorber undergoes a small stroke, the fluid flows through two separate flow paths to provide a soft damping. When the shock absorber undergoes a large stroke, fluid flow in one of two paths progressively reduces to provide a firm damping.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
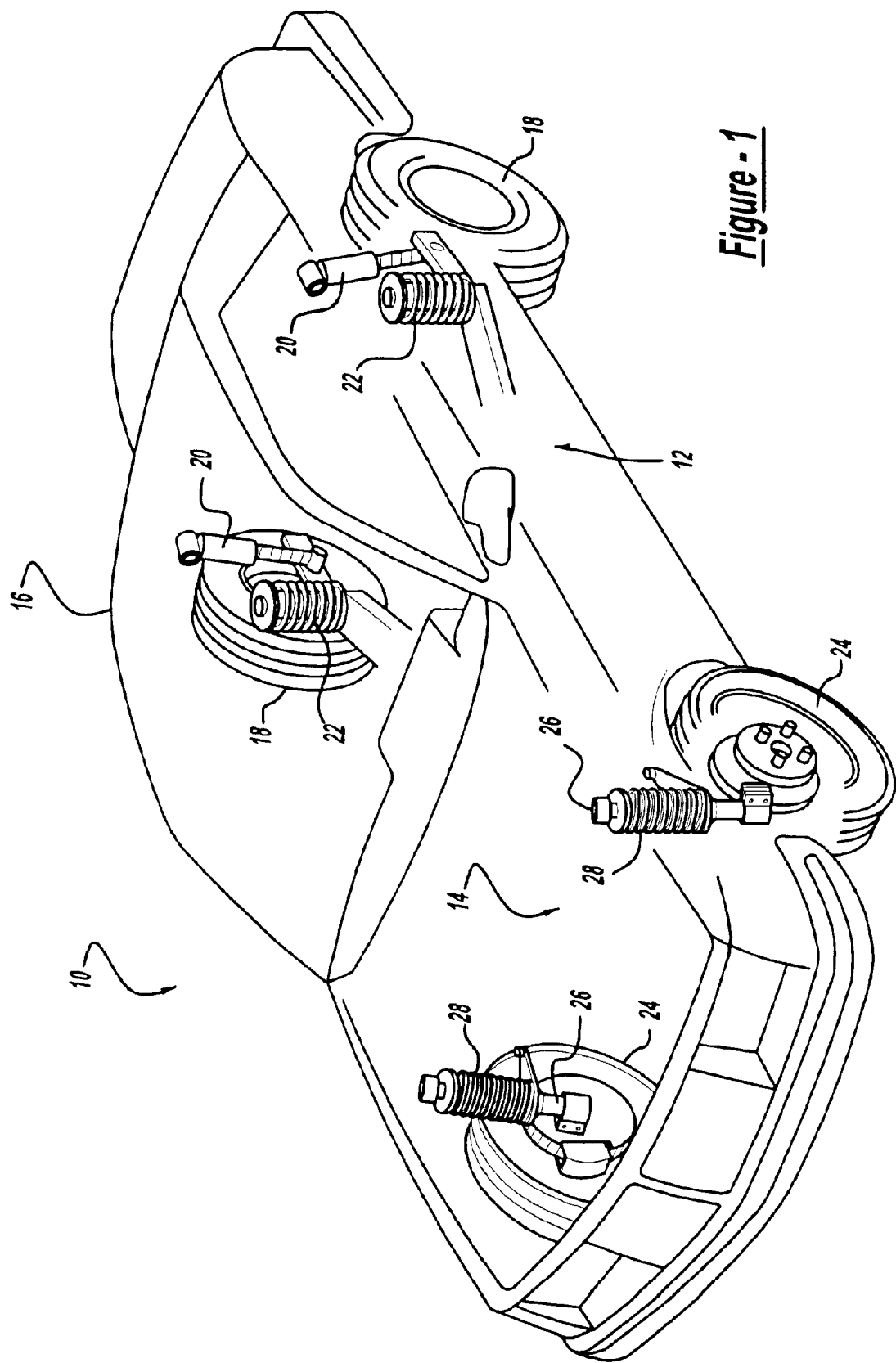
FIG. 1 is an illustration of an automobile using shock absorbers incorporating the multi-force damping force generating device in accordance with the present invention.

Referring now to the drawings in which like reference numerals designate like or corresponding parts throughout the several views, there is shown in FIG. 1 a vehicle incorporating a suspension system having the multi-force damping shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
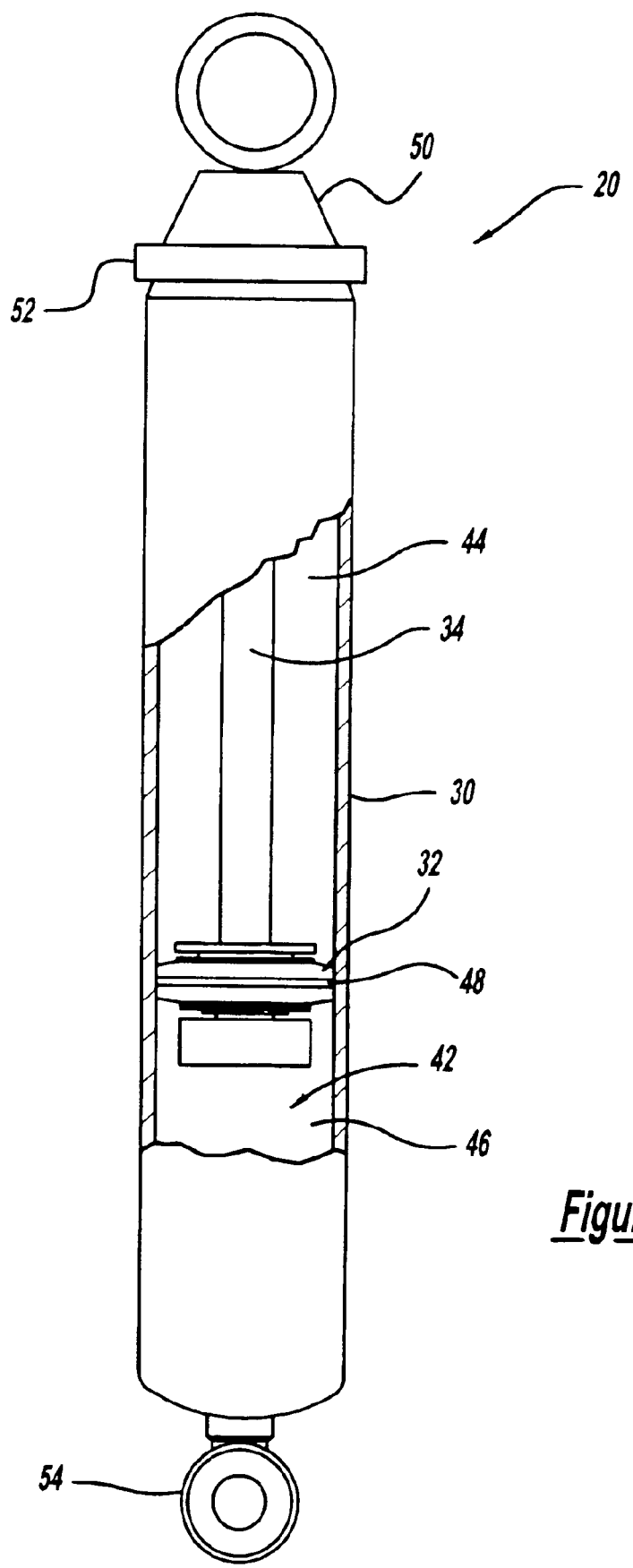
FIG. 2 is a cross-sectional side view of a monotube shock absorber incorporating the multi-force damping force generating device in accordance with the present invention.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
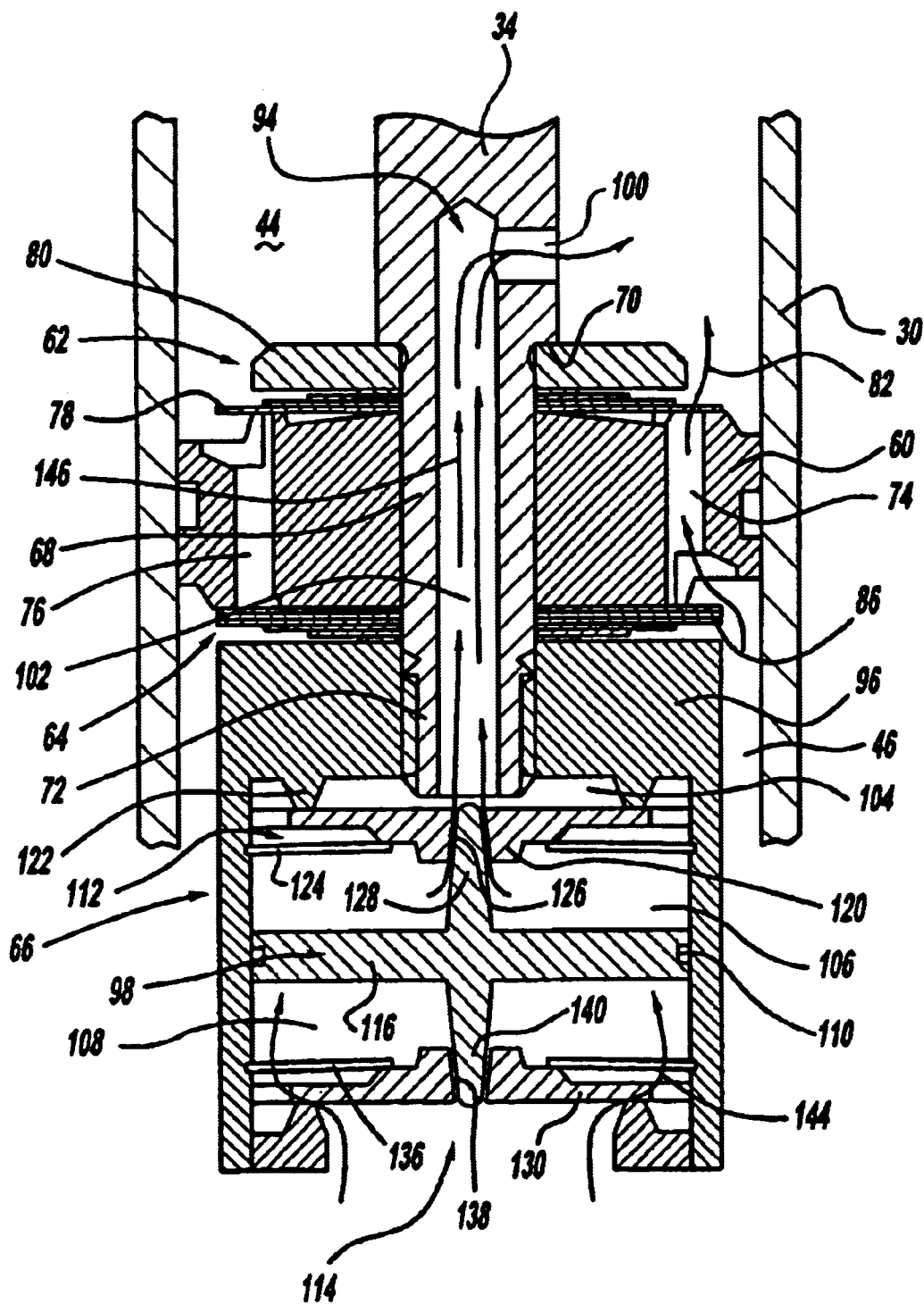
FIG. 3 is an enlarged cross-sectional side view illustrating the piston assembly of the shock absorber shown in FIG. 1 during a compression stroke of the shock absorber.
Figure 4:
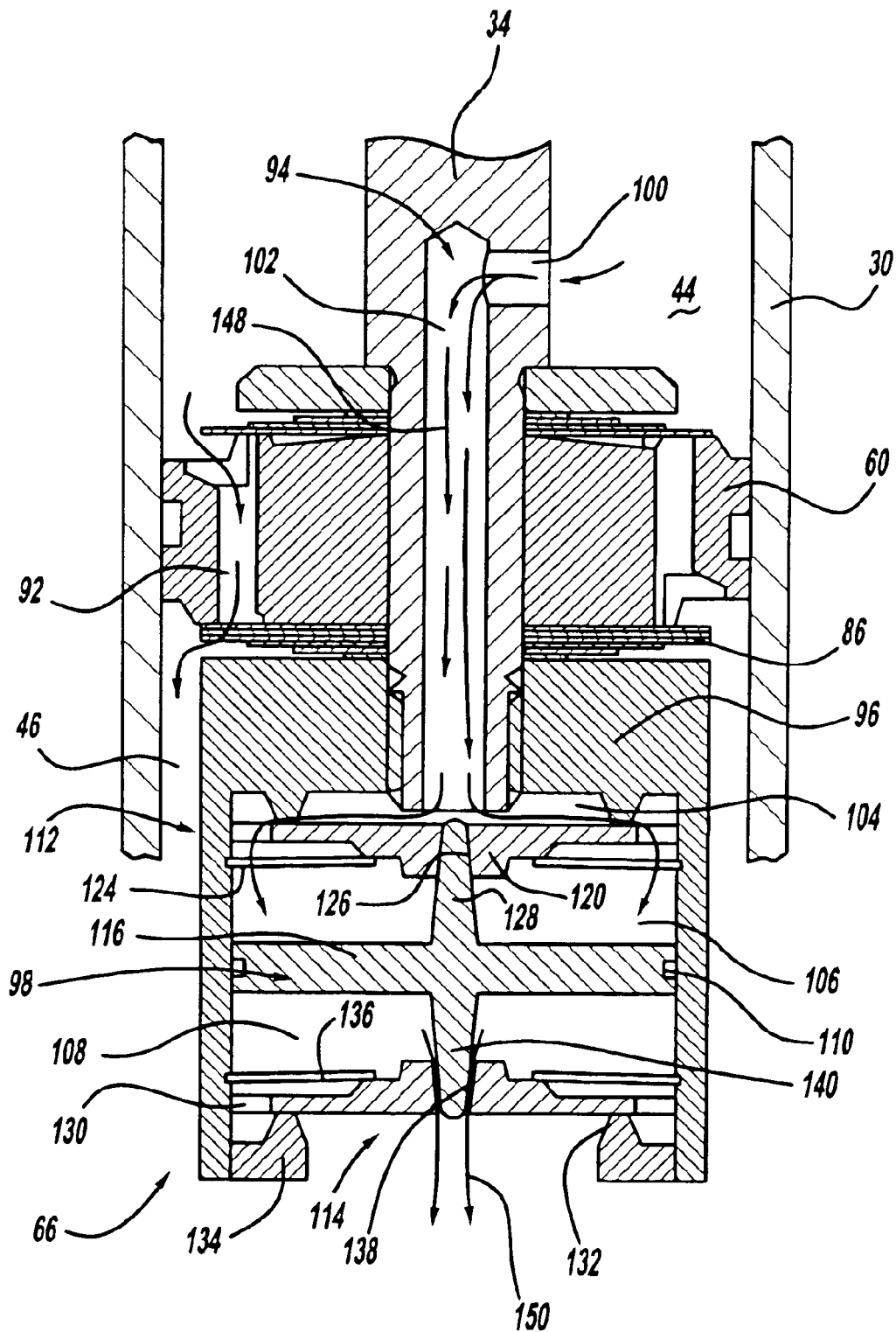
FIG. 4 is an enlarged cross-sectional side view illustrating the piston assembly of the shock absorber shown in FIG. 1 during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a sliding piston assembly 66. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70 and with rebound valve assembly 64 being located between piston body 60 and a threaded end 72 of piston rod 34. Piston body 60 defines a plurality of compression flow passages 74 and a plurality of rebound flow passages 76.

Compression valve assembly 62 comprises a plurality of compression valve plates 78 and a valve stop 80. Valve plates 78 are disposed adjacent to piston body 60 to cover the plurality of compression flow passages 74. Valve stop 80 is disposed between valve plates 78 and shoulder 70 to limit the deflection of valve plates 78. During a compression stroke of shock absorber 20, fluid pressure builds up in lower working chamber 46 until the fluid pressure applied to valve plates 78 through flow passages 74 overcomes the load required to deflect valve plates 78. Valve plates 78 elastically deflect opening flow passages 74 to allow fluid to flow from lower working chamber 46 to upper working chamber 44 as shown by arrows 82 in FIG. 3.

Rebound valve assembly 64 comprises a plurality of valve plates 86. Valve plates 86 are disposed adjacent to piston body 60 to cover the plurality of rebound flow passages 76. Sliding piston assembly 66 is threaded onto threaded end 72 of piston rod 34 to retain valve plates 86 against piston body 60 to close flow passages 76. During an extension stroke of shock absorber 20, fluid pressure builds up in upper working chamber 44 until the fluid pressure applied to valve plates 86 through flow passages 76 overcomes the load required to deflect valve plates 86. Valve plates 86 elastically deflect opening flow passages 76 to allow fluid to flow from upper working chamber 44 to lower working chamber 46 as shown by arrows 92 in FIG. 4.

Sliding piston assembly 66 comprises a flow passage 94, a housing 96 and a sliding piston assembly 98. Flow passage 94 extends through piston rod 34 and includes a radial passage 100 and an axial passage 102 which opens into a pressure chamber 104 defined by housing 96 and sliding piston assembly 98. Housing 96 is a cup shaded housing threadingly received onto threaded end 72 of piston rod 34. Housing 96 clamps valve plates 86 against piston body 60 and also acts as a stop to limit the deflection of valve plates 86. Sliding piston assembly 98 is slidingly received within housing 96 and it defines an upper fluid chamber 106 and a lower fluid chamber 108. A seal 110 is disposed between sliding piston assembly 98 and housing 96 to permit sliding movement of sliding piston assembly 98 with respect to housing 96 without generating undue frictional forces as well as sealing upper fluid chamber 106 from lower fluid chamber 108.

Sliding piston assembly 98 comprises a compressor valve assembly 112, a rebound valve assembly 114 and a piston 116. Compression valve assembly 112 includes a valve plate 120 biased against an annular land 122 defined by housing 96 by a spring 124 to define a first compression bleed valve assembly. Valve plate 120 defines a restriction hole 126 through which a needle 128 defined by piston 116 extends to define a second compression bleed valve assembly. The design for restriction hole 126 and needle 128 and the strength of spring 124 determines the performance of compression bleed valve assembly 112. Rebound valve assembly 114 includes a valve plate 130 biased against an annular land 132 defined by a retainer 134 by a spring 136 to define a first rebound bleed valve assembly. Retainer 134 is secured to housing 96 by threaded engagement, press fitting or other means known in the art. Valve plate 130 defines a restriction hole 138 through which a needle 140 defined by piston 116 extends to define a second rebound valve assembly. The design for restriction hole 138 and needle 140 and the strength of spring 136 determines the performance of rebound valve assembly 114.

Referring now to FIG. 3, during a compression stroke, fluid in lower working chamber 46 is compressed and fluid flows between lower working chamber 46 and upper working chamber 44 through flow passages 74 overcoming the load required to deflect valve plates 78 opening flow passages 74 (arrows 82). Fluid pressure within lower working chamber 46 also reacts against the bottom of valve plate 130 causing valve plate 130 to lift against the load of spring 136. The lifting of valve plate 130 causes fluid to flow past valve plate 130 to enter pressurized fluid chamber 108 as shown by the arrows 144 and react against the bottom of piston 116 causing fluid to flow out to pressurized fluid chamber 106 through restriction hole 126 past needle 128 into pressurize fluid chamber 104, through flow passage 94 and into upper working chamber 44. (Arrows 146) As fluid pressure within lower working chamber 46 increases both piston 116 and valve plate 130 will move upwards slowly reducing the fluid flow through restriction hole 126 past needle 128. Thus, for small movements, there will be two flow paths as shown by arrows 82 and 146. As the amount or rate of compression stroke increases, the fluid flow through restriction hole 126 (arrows 146) will gradually decrease to provide a smooth transition from an initially soft damping to a firm damping condition for shock absorber 20. The slow closing of restriction hole 126 by needle 128 will provide the smooth transition.

Referring now to FIG. 4, during a rebound stroke, fluid in upper working chamber 44 is compressed and fluid flows between upper working chamber 44 and lower working chamber 46 through flow passages 76 overcoming the load required to deflect valve plates 86 opening flow passages 76 (arrows 92). Fluid pressure within upper working chamber 44 also flows through passage 94 and into chamber 104 to react against the upper surface valve plate 120 causing valve plate 120 to lift against the load of spring 124. The lifting of valve plate 120 causes fluid to flow past valve plate 120 into upper pressure fluid chamber 106 (arrow 148). The fluid within upper pressure chamber 106 will react against piston 116 causing fluid flow out of pressurized fluid chamber 108 through restriction hole 138 past needle 140 and into lower working chamber 46 (arrows 150). As fluid pressure within upper working chamber 44 increases, both piston 116 and valve plate 120 will move downwardly slowly reducing the fluid flow through restriction hole 138 past needle 140. Thus, for small movements, there will be two flow paths as shown by arrows 92 and 150. As the amount or rate of extension increases, the fluid flow through restriction hole 138 (arrows 150) will gradually decrease to provide a smooth transition from an initially soft damping to a firm damping condition for shock absorber 20. The slow closing of restriction hole 138 by needle 140 will provide the smooth transition.

Thus, shock absorber 20 provides a soft damping or comfort setting for small strokes and a firm (safety) setting for larger strokes. The multi-force damping characteristics work both in compression and in rebound or extension. In addition the multi-force damping is not position dependent and it provides a smooth transition between soft and firm damping avoiding unwanted switching noise. While the invention has been illustrated incorporated into a monotube shock absorber, it is within the scope of the present invention to incorporate sliding piston assembly 66 into a double tube design if desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-stage shock absorber comprising:
a pressure tube defining a chamber;
a piston member slidably disposed within said pressure tube, said piston member dividing said chamber into an upper working chamber and a lower working chamber;
a piston rod extending through said upper working chamber and projecting out of said pressure tube, said piston rod being attached to said piston member;
a first valve assembly attached to said piston member, said first valve assembly permitting fluid flow from said upper working chamber to said lower working chamber through a first passage defined by said piston member, said first valve assembly restricting fluid flow from said lower working chamber to upper said working chamber;
a second valve assembly attached to said piston member, said second valve assembly permitting fluid flow from said lower working chamber to said upper working chamber through a second passage defined by said piston member, said second valve assembly restricting fluid flow from said upper working chamber to said lower working chamber;
a housing attached to said piston rod, said housing defining a pressure chamber;
a piston slidably disposed within said pressure chamber, said piston dividing said pressure chamber into a lower fluid chamber and an upper fluid chamber within said housing;
a first bleed valve assembly disposed between said upper fluid chamber and said upper fluid chamber, said first bleed valve assembly controlling fluid flow between said pressure chamber and said upper fluid chamber, said first bleed valve assembly including a first needle extending through a first restriction; and
a third passage defined through said piston rod, said third passage extending between said upper working chamber and said upper fluid chamber.

2. The two stage shock absorber according to claim 1 wherein said shock absorber further comprises a second bleed valve assembly disposed between said lower fluid chamber and said lower working chamber for controlling fluid flow between said lower fluid chamber and said lower working chamber.

3. The two stage shock absorber according to claim 2 wherein said shock absorber further comprises a third bleed valve assembly disposed between said upper fluid chamber and said pressure chamber for controlling fluid flow between said pressure chamber and said upper fluid chamber.

4. The two stage shock absorber according to claim 3 wherein said shock absorber further comprises a fourth bleed valve assembly disposed between said lower fluid chamber and said lower working chamber for controlling fluid flow between said lower fluid chamber and said lower working chamber.

5. The two stage shock absorber according to claim 4 wherein said second bleed valve assembly comprises a second needle extending through a second restriction, said third bleed valve assembly comprises a first valve plate and a first biasing member biasing said first valve plate against said housing, said first valve plate defining said first restriction, and said fourth bleed valve assembly comprises a second valve plate and a second biasing member biasing said second valve plate against said housing, said second valve plate defining said second restriction.

6. The two stage shock absorber according to claim 5 wherein said first and second needles are attached to said piston.

7. The two stage shock absorber according to claim 2 wherein said second bleed valve assembly comprises a second needle extending through a second restriction.

8. The two stage shock absorber according to claim 7 wherein said first and second needles are attached to said piston.

9. The two stage shock absorber according to claim 2 wherein said shock absorber further comprises a third bleed valve assembly disposed between said lower fluid chamber and said lower working chamber for controlling fluid flow between said lower fluid chamber and said lower working chamber.

10. The two stage shock absorber according to claim 1 wherein said shock absorber further comprises a second bleed valve assembly disposed between said upper fluid chamber and said pressure chamber for controlling fluid flow between said pressure chamber and said upper fluid chamber.

11. The two stage shock absorber according to claim 10 wherein said second bleed valve assembly comprises a valve plate and a biasing member biasing said valve plate against said housings said valve plate defining said first restriction.

12. The two stage shock absorber according to claim 1 wherein said housing is threadingly received on said piston rod.

* * * * *